(12) United States Patent
Bauknecht et al.

(10) Patent No.: US 6,595,339 B1
(45) Date of Patent: Jul. 22, 2003

(54) VARIABLE GEAR RATIO TRANSMISSION

(75) Inventors: Gert Bauknecht, Immenstaad (DE); Manfred Bucksch, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/980,319

(22) PCT Filed: Jul. 7, 2000

(86) PCT No.: PCT/EP00/06438
§ 371 (c)(1),
(2), (4) Date: Nov. 15, 2001

(87) PCT Pub. No.: WO01/04518
PCT Pub. Date: Jan. 18, 2001

(30) Foreign Application Priority Data

Jul. 13, 1999 (DE) .......................................... 199 32 614

(51) Int. Cl.⁷ .............................................. F16H 63/30
(52) U.S. Cl. .............................. 192/85 AA; 192/106 F; 192/109 F
(58) Field of Search .......................... 192/106 F, 109 F, 192/85 AA, 85 CA; 475/284, 331, 269

(56) References Cited

U.S. PATENT DOCUMENTS

| 3,724,626 | A |   | 4/1973  | Clauss, Jr. et al. ....... 192/109 F |
| 4,403,527 | A |   | 9/1983  | Mohl et al. ................... 74/851 |
| 4,732,253 | A | * | 3/1988  | Hiramatsu et al. ........ 192/87.11 |
| 4,957,195 | A | * | 9/1990  | Kano et al. ............... 192/106 F |
| 5,106,352 | A |   | 4/1992  | Lepelletier .................. 475/280 |
| 5,172,799 | A |   | 12/1992 | Iijima et al. ............. 192/106 F |
| 5,383,824 | A |   | 1/1995  | Runge et al. ................ 477/110 |
| 5,511,644 | A | * | 4/1996  | Murata ................... 192/85 AA |
| 5,630,492 | A | * | 5/1997  | Yoshikawa et al. ...... 192/106 F |
| 5,647,467 | A | * | 7/1997  | Yamauchi ................. 192/87.11 |
| 5,647,816 | A | * | 7/1997  | Michioka et al. ........... 475/285 |
| 5,865,289 | A | * | 2/1999  | Ishimaru .................. 192/87.11 |
| 5,887,690 | A | * | 3/1999  | Haupt ...................... 192/87.11 |
| 5,950,787 | A | * | 9/1999  | Murasugi et al. ........ 192/85 AA |

FOREIGN PATENT DOCUMENTS

| DE | 2 016 712    | 10/1971 | .......... B60K/17/02 |
| DE | 29 35 916 A1 | 4/1981  | .......... B60K/41/06 |
| DE | 40 37 092 A1 | 5/1992  | .......... B60K/41/04 |
| EP | 0 434 525 B1 | 6/1991  | ............. F16H/3/66 |
| EP | 0 640 773 A1 | 3/1995  | ......... F16D/25/063 |
| EP | 0 775 855 A1 | 5/1997  | .......... F16H/63/30 |

* cited by examiner

Primary Examiner—Saul Rodriguez
(74) Attorney, Agent, or Firm—Davis & Bujold, P.L.L.C.

(57) ABSTRACT

The multi-step automatic transmission with a number of clutches and brakes which at least partly are designed as wet-running, multi-disk clutches wherein with each clutch is associated a hydraulic piston (1), is provided with a baffle plate (2) for the fluid within or outside the clutch for adapting the shifting forces to low torques so that an additional pressure chamber (3) is formed which does not impair the total stroke of the piston (1).

7 Claims, 2 Drawing Sheets

VARIABLE GEAR RATIO TRANSMISSION

FIELD OF THE INVENTION

This invention relates to a multi-step automatic transmission for motor vehicles having a plurality of clutches and brakes designed at least partly as wet-running, multi-disk clutches with inner and outer disk carriers each provided with one set of disks.

BACKGROUND OF THE INVENTION

Multi-step automatic transmissions for motor vehicles are widely known. EP-B 434 525 thus describes an automatic transmission for motor vehicles which has planetary gear sets shifted by means of clutches and brakes and connected with a hydraulic torque converter provided with a lock-up clutch. The automatic transmission further has an input shaft and an output shaft with a double planetary gear set, at least one power path between the input shaft and the double planetary gear set, the same as three clutches and two brakes, the selective engagement by pairs of which determines different reduction ratios between the input shaft and the output shaft. Six forward gears and one reverse gear can be obtained by the three clutches and two brakes.

In motor vehicles having automatic transmissions, there occur in certain situations such as during positive and negative load change, shifting jerks that impair the comfort. In order to prevent such a shifting jerk during the gear shift of the automatic transmission, it was already proposed in DE-C 29 35 916 that the torque of the internal combustion engine be reduced during the gear shift. Together with the reduction of the shifting jerk, it is also possible, by virtue of the torque of the internal combustion engine reduced during the shifting process, to reduce the grinding time of the friction clutches of the automatic transmission that take part in the gear shift so that less wear and slighter heating of the friction elements occur. The control electronic system for the internal combustion engine is equipped with an identification shifting system which, during gear shift, receives from the transmission control a shifting signal. In a memory of the control device for the internal combustion engine characteristic fields are stored according to which the ignition angle and/or the injection pulse width are controlled according to load and rotational speed. The exact detection of the moment of reduction of the torque is problematic here.

DE-A 40 37 092 describes a method for control of the torque by means of an internal combustion engine connected with an automatic transmission which is driven by the internal combustion engine, there being associated with the latter a control electronic system, which based on rotational speed, load and optionally temperature signals, controls the ignition angle of the ignition device and/or the injection pulse width of the fuel injection device. A transmission electronic system associated with the automatic transmission controls for its part, based on rotational speed and load requirement signals, the gear shifts of the automatic transmission.

One other possibility of improving the comfort in shifting consists in associating with the engine electronic system so-called comfort filters as dampers of load change and jerks, the periods of time of the comfort filters between the driver's wish and ratio of the inner engine being preset exclusively by the electronic system of the internal combustion engine.

Another problem in modern multi-step automatic transmissions consists in that, on one hand, to maintain very high static torques with one clutch and, on the other, with the same clutch to govern gear shifts with slight load or rolling out gear shifts absolutely without load, creates serious problems. In the design of the clutch, compromises have to be made here which impair the comfort during shifting.

The problem to be solved by this invention is to configure a multi-step automatic transmission for motor vehicles so that the impairments to comfort in shifting do not occur.

Based on a multi-step automatic transmission of the kind specified above, the problem is solved with the features stated in the characteristic part of claim 1; advantageous developments are described in the sub-claims.

SUMMARY OF THE INVENTION

The invention, therefore, proposes that the piston space of the clutch is divided by a baffle plate for the hydraulic oil so that first and second pressure chambers are formed configured so that the total stroke of the piston is not impaired.

The baffle plate can be located inside or outside the clutch; inasmuch as the required differential surface is not obtained by the two pressure chambers separated from each other by the baffle plate, each pressure chamber is advantageously provided with a fluid pipe so that the two pressure chambers can be loaded with different pressures.

Therefore with the inventive development, the advantage obtained is that by providing a differential surface on the same clutch, the large piston surface needed for the high static retaining torque of the clutch is reduced so that the gear shifts can be reduced according to the differential surface; this means an optimal adaptation of the clutch to high retaining torques and low shifting torques without an additional clutch that increases the expenses. The differential surface formed here is easily controlled by the electronic control unit of the transmission.

BRIEF DESCRIPTION OF THE DRAWINGS

The invention is explained in detail with reference to the drawings where two advantageous embodiments are shown. In the drawings.

DETAILED DESCRIPTION OF THE INVENTION

Figure 1:
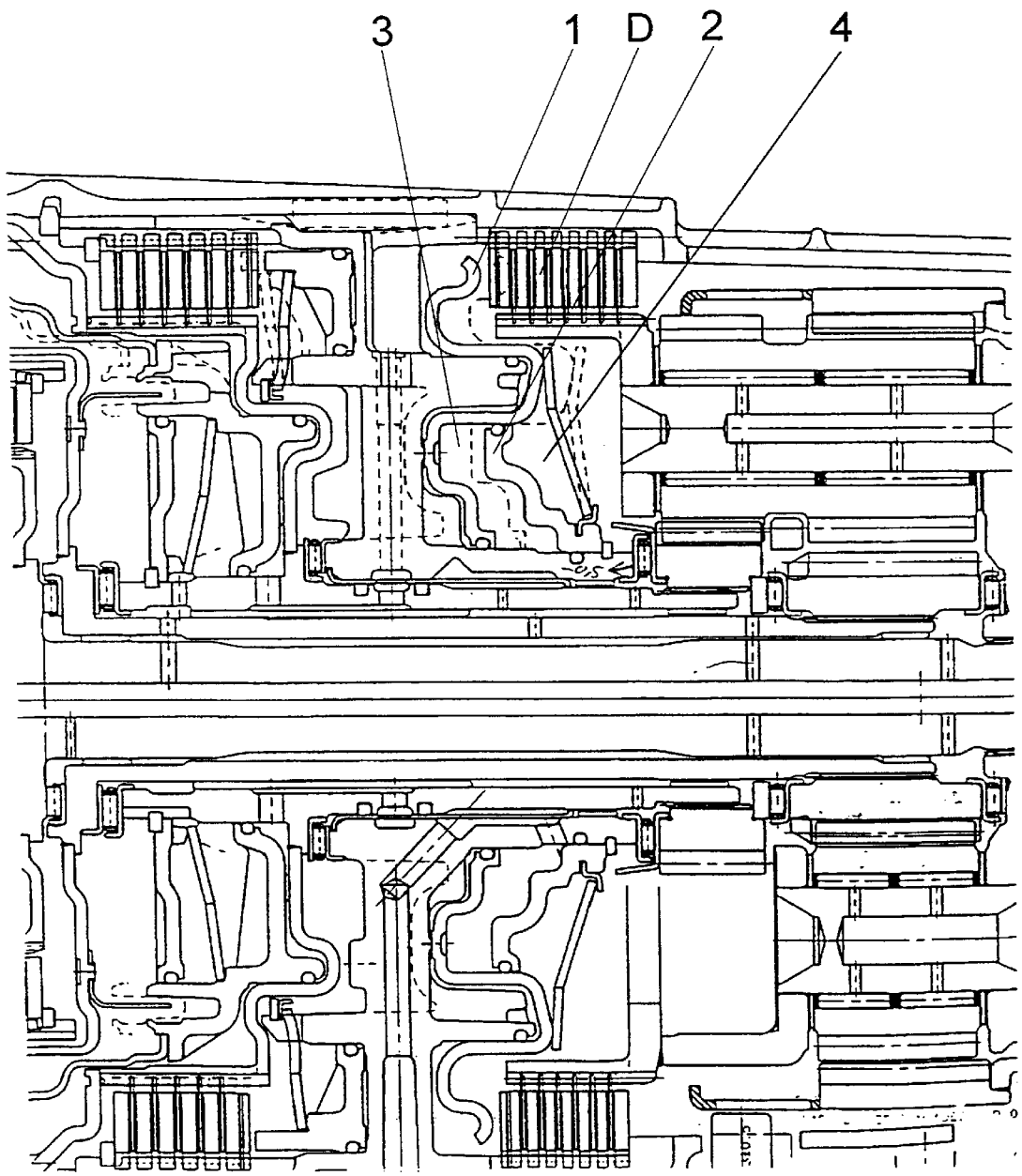
FIG. 1 is a partial section through a multi-step automatic transmission with one baffle plate situated within the clutch.

Since the expert is familiar with multi-step automatic transmissions, in the enclosed figures, where the same parts are provided with the same reference numeral, only the parts needed for understanding of the invention are provided with reference numerals.

In the partial section shown in FIG. 1, with 1 is designated the hydraulic piston for actuating a wet-running, multi-disk clutch of a multi-step automatic transmission designated with D on which is front mounted a baffle plate 2 in a manner such that in the clutch D a first pressure chamber 3 is formed which is controlled so that the total stroke of the piston 1 is not hindered. In case of gear shifts with low torque requirement, i.e. in gear shifts with small load or in roll out gear shifts without load, both the second pressure chamber 4 and the first pressure chamber 3 separated by the baffle plate 2 are supplied with equal fluid pressure.

Due to the opposite support of the pressure forces, the difference of the two pressure surfaces now becomes only more operative so that the shifting forces are adapted to the low torque to be shifted.

Figure 2:
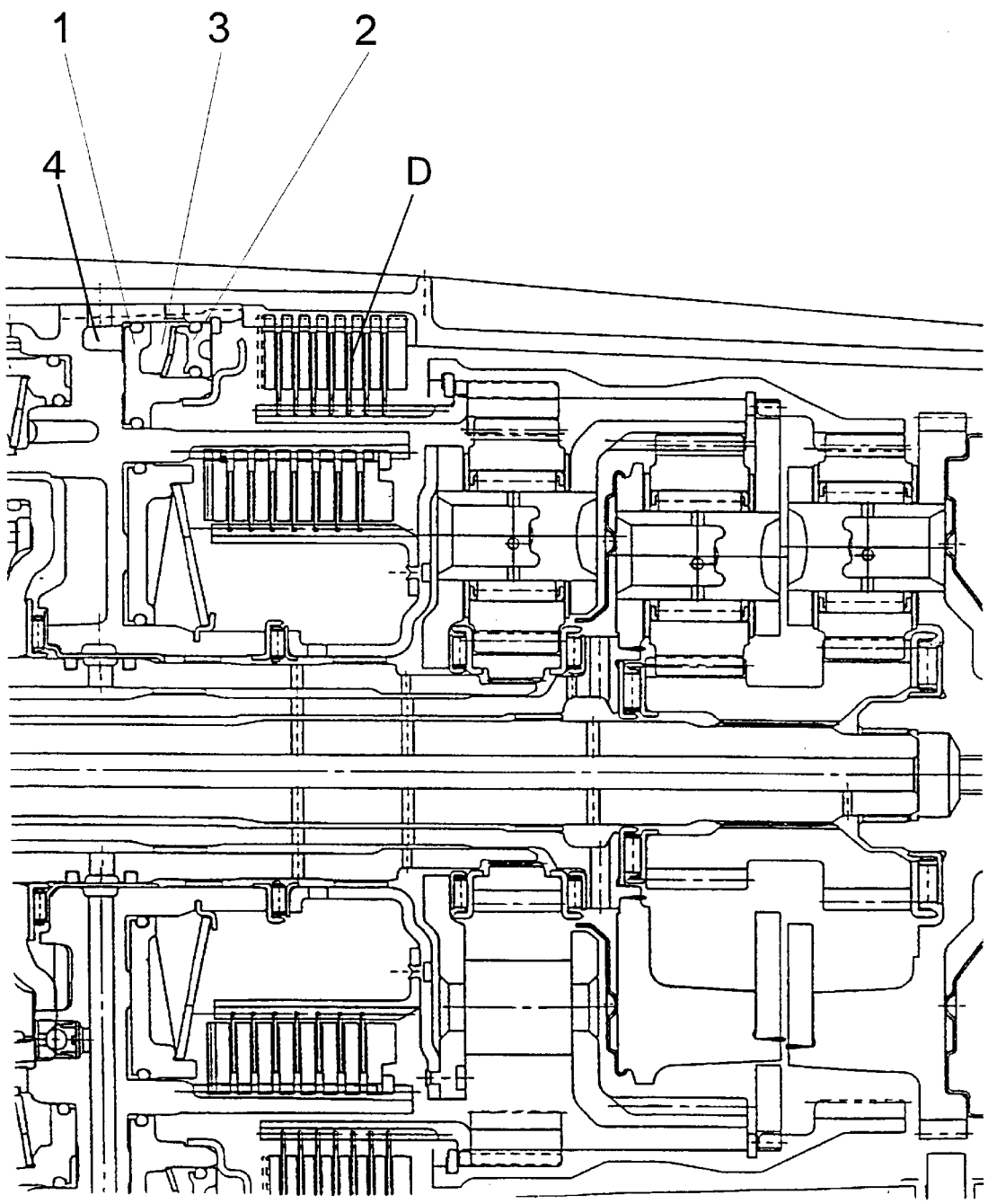
FIG. 2 is a partial section through a multi-step automatic transmission with one baffle plate situated outside the clutch.

In the embodiment shown in FIG. 1, the baffle plate 2 is situated within the clutch D; in the embodiment shown in FIG. 2, the baffle plate 2 is situated outside the clutch, the first pressure chamber formed between piston 1 and piston 2 being here also designated with 3; and the second pressure chamber formed besides piston 1 being here also designated with 4.

Inasmuch as for constructional reasons, it is not possible to obtain the needed differential surface so that during opposite support of the pressure forces no difference of the two pressure surfaces is operative, the two pressure chambers can also be loaded with different pressures in order to make the gear shifts sensitive by slight shifting forces; to this end the two pressure chambers 3, 4 are then each to be provided with an individual fluid pipe and separately controlled.

Reference Numerals 1 piston
2 baffle plate
3 pressure chamber
4 pressure chamber
5 D clutch

What is claimed is:

1. A multi-step automatic transmission for a motor vehicle with a plurality of clutches and brakes which are designed, at least partly, as wet-running multi-disk clutches with inner and outer disk carriers, and each of the inner disk carriers having a disk set and each of the outer disk carriers having a disk set, the disk set of the inner disk carrier together with an associated disk set of the outer disk carrier forming a clutch, and a hydraulic piston (1) being associated with each clutch for engaging and disengaging the clutch;

wherein a baffle plate (2) is associated with the piston (1) of the clutch such that the piston space is separated into a first pressure chamber (3) and a second pressure chamber (4), and the first pressure chamber (3) and the second pressure chamber (4) are both loadable with a desired variable pressure without hindering a total stroke of the piston (1).

2. The multi-step automatic transmission according to claim 1, wherein the baffle plate (2) is situated inside the clutch.

3. The multi-step automatic transmission according to claim 1, wherein each of the first pressure chamber (3) and the second pressure chamber (4) is provided with a fluid pipe to supply the respective pressure chambers with different pressures.

4. The multi-step automatic transmission according to claim 1, wherein the pressure of the first pressure chamber (3) and the pressure of the second pressure chamber (4) are independently variable.

5. The multi-step automatic transmission according to claim 1, wherein the pressure of the first pressure chamber (3) and the pressure of the second pressure chamber (4) are modulated Independently of one another.

6. A multi-step automatic transmission for a motor vehicle with a number of clutches and brakes which at least partly are designed as wet-running multi-disk clutches with inner and outer disk carriers each provided with a disk set, the disk set of an inner disk carrier together with an associated disk set of the outer disk carrier forming a clutch and with each clutch is associated a hydraulic piston (1) for engaging and disengaging the clutch, wherein with the piston (1) of the clutch is associated a baffle plate (2) for the hydraulic fluid in a manner such that a first pressure chamber (3) and a second pressure chamber (4) are formed which can be loaded with a variable pressure and are designed so as not to hinder the total stroke of the piston (1); and the baffle plate (2) is situated outside the clutch.

7. A multi-step automatic transmission for a motor vehicle with a plurality of clutches and brakes which are designed, at least partly, as wet-running multi-disk clutches with inner and outer disk carriers, and each of the inner disk carriers having a disk set and each of the outerdisk carriers having a disk set, the disk set of the inner disk carrier together with an associated disk set of the outer disk carrier forming a clutch, and a hydraulic piston (1) being associated with each clutch for engaging and disengaging the clutch;

wherein a baffle plate (2) is associated with the piston (1) of the clutch such that the piston space is divided into a first pressure chamber (3) and a second pressure chamber (4), the first and second pressure chambers are each loadable with a desired variable pressure without hindering a total stroke of the piston (1), and the baffle plate (2) is situated outside the clutch.

* * * * *